(12) United States Patent
Tobishima (10) Patent No.: US 6,705,688 B2
(45) Date of Patent: Mar. 16, 2004

(54) ELECTRONIC EQUIPMENT

(75) Inventor: Yasuyuki Tobishima, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/092,615

(22) Filed: Mar. 8, 2002

(65) Prior Publication Data

US 2002/0135279 A1 Sep. 26, 2002

(30) Foreign Application Priority Data

Mar. 9, 2001 (JP) ........................................ 2001-066557

(51) Int. Cl.[7] ............................ A47B 97/00; G11B 33/02
(52) U.S. Cl. ................................... 312/223.1; 369/75.1
(58) Field of Search ........................... 312/223.1, 223.2, 312/265.6, 326, 327, 328, 319.1, 319.2; 360/137; 361/683, 724; 369/75.1

(56) References Cited

U.S. PATENT DOCUMENTS

| | | | | |
|---|---|---|---|---|
| 5,010,437 A | * | 4/1991 | Utsugi et al. | ............... 360/137 |
| 5,177,730 A | * | 1/1993 | Utsugi | ....................... 369/75.1 |
| 5,199,888 A | * | 4/1993 | Condra et al. | ............... 439/142 |
| 5,574,625 A | * | 11/1996 | Ohgami et al. | ......... 361/683 X |
| 5,852,594 A | | 12/1998 | Kaise et al. | |
| 5,926,916 A | * | 7/1999 | Lee et al. | ............... 361/724 X |
| 6,411,583 B1 | * | 6/2002 | Yamamoto et al. | .... 369/75.1 X |

FOREIGN PATENT DOCUMENTS

| | | |
|---|---|---|
| EP | 1 067 554 A2 | 1/2001 |
| JP | 9-158938 * | 6/1997 |

* cited by examiner

*Primary Examiner*—James O. Hansen
(74) *Attorney, Agent, or Firm*—Sughrue Mion, PLLC (57) ABSTRACT

In an electronic equipment, an equipment body includes a projection portion to be fitted into a depression portion provided in a front panel, a sector gear to be turned when the projection portion is fitted into the depression portion, a drive gear, a flange portion, an engaging member to be engaged with an engaging projection portion, which abuts against the flange portion and is provided in the front panel, and a spring for moving the engaging member to a place, at which the engaging member engages with the engaging projection portion, when the projection portion is fitted into the depression portion and when an abutting state, in which the engaging projection portion abuts against the flange portion, is canceled as the flange portion performs a turning operation.

4 Claims, 13 Drawing Sheets

ELECTRONIC EQUIPMENT

BACKGROUND OF THE INVENTION

1. Field of the Invention

The present invention generally relates to electronic equipment having a front panel that is attachable to and detachable from an equipment body, and more particularly to a mechanism for attaching/detaching the front panel.

2. Description of the Related Art

Among conventional pieces of electronic equipment having a front panel, there is a piece of such electronic equipment, which has a tiltable front panel adapted to be turned in the direction of thickness of an equipment body thereof by fitting spindles into, for example, both side parts of the bottom portion of the front panel, respectively, and by using each of the spindles as a turning shaft. In the electronic equipment having the tiltable front panel, an insertion hole formed in the front surface portion of the equipment body, into which a recording medium, such as a CD (Compact Disc), is inserted, is opened by turning the front panel. Regarding the electronic equipment having such a tiltable front panel, a mechanism for attaching the front panel to the equipment body and for detaching the front panel therefrom has been proposed. The conventional mechanism for attaching and detaching the front panel is described hereinbelow by referring to FIGS. 10 to 13.

Figure 10:
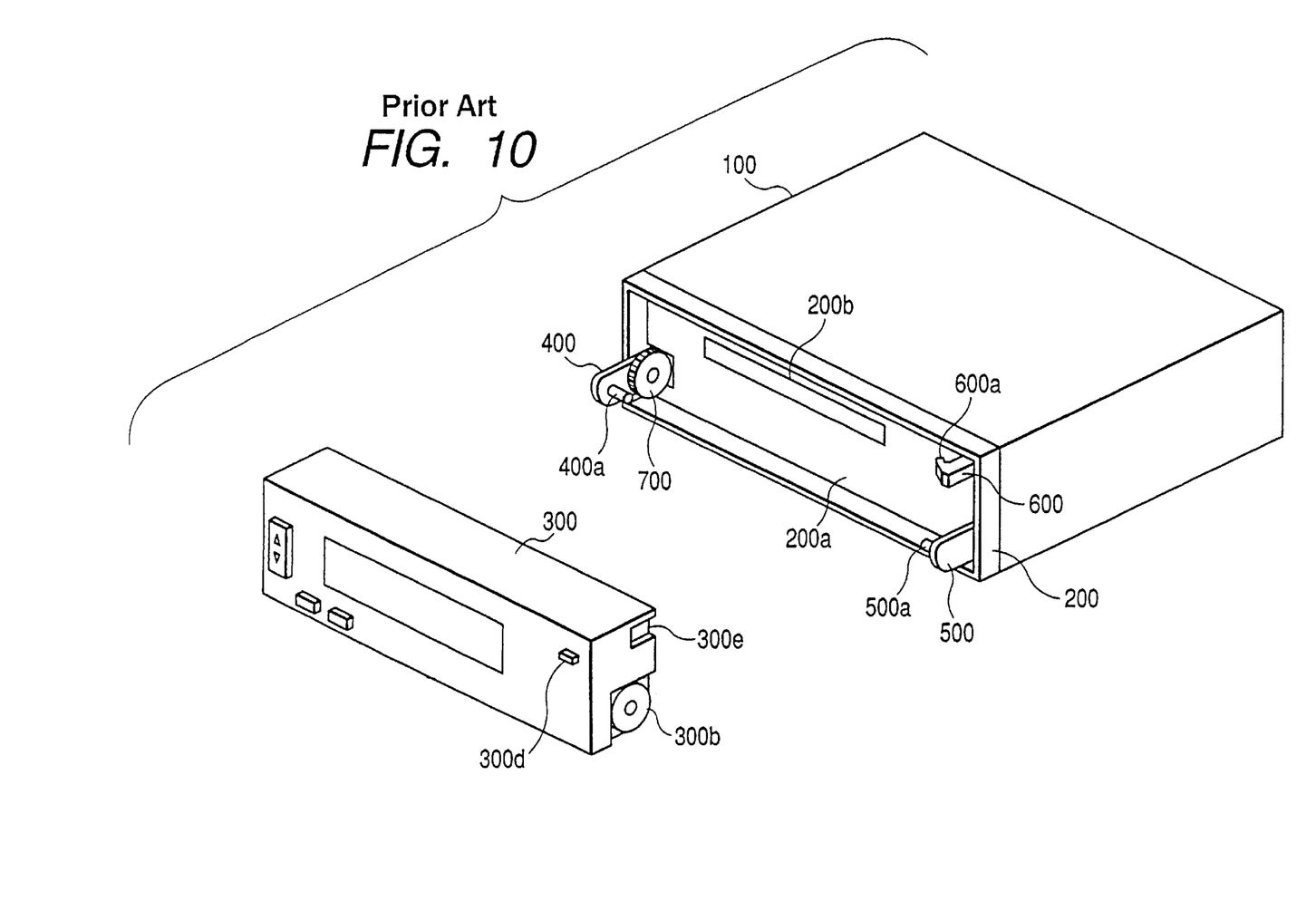
FIG. 10 is a view used for illustrating a front-panel attaching/detaching mechanism of conventional electronic equipment.
Figure 11:
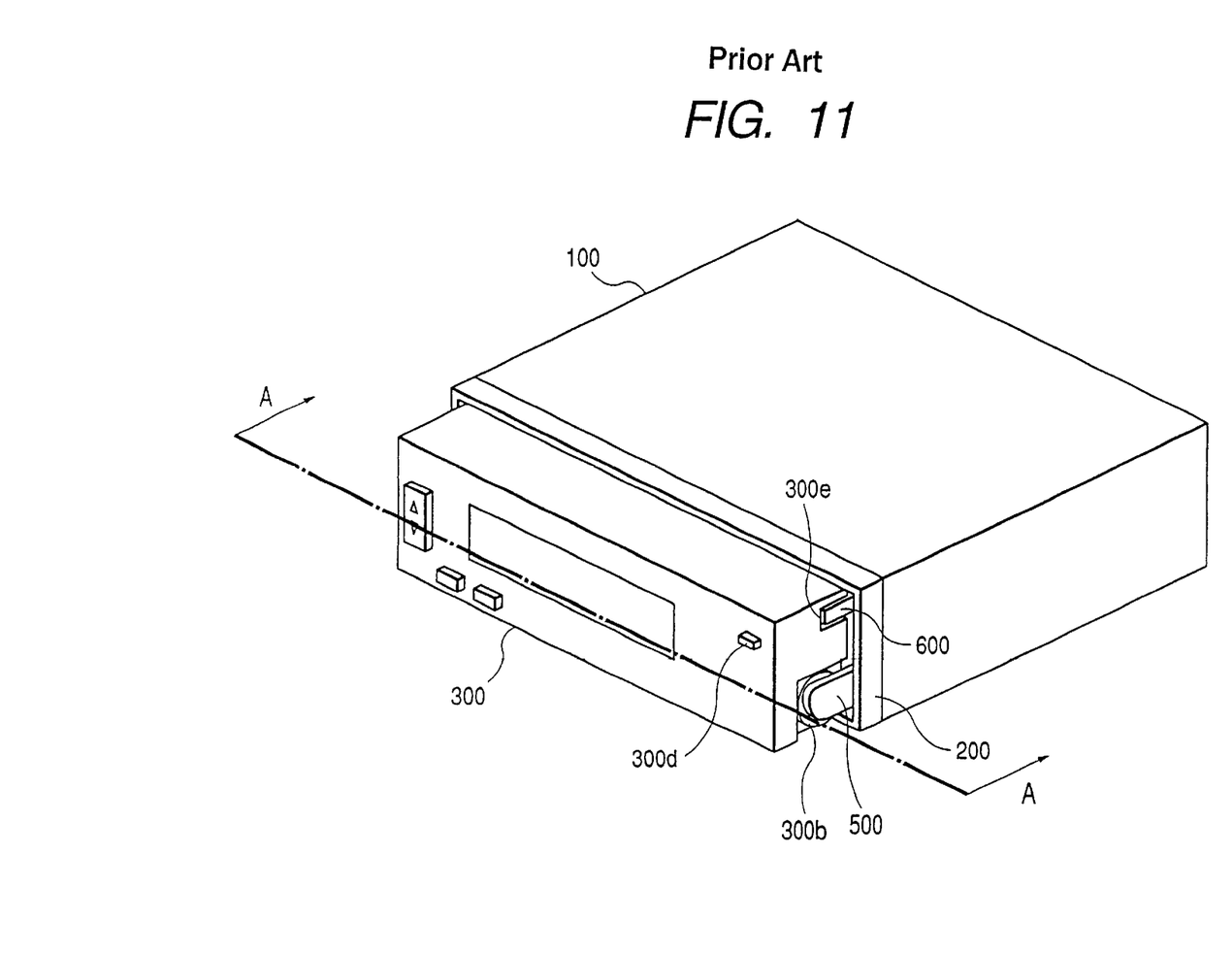
FIG. 11 is another view used for illustrating the front-panel attaching/detaching mechanism of the conventional electronic equipment.
Figure 12:
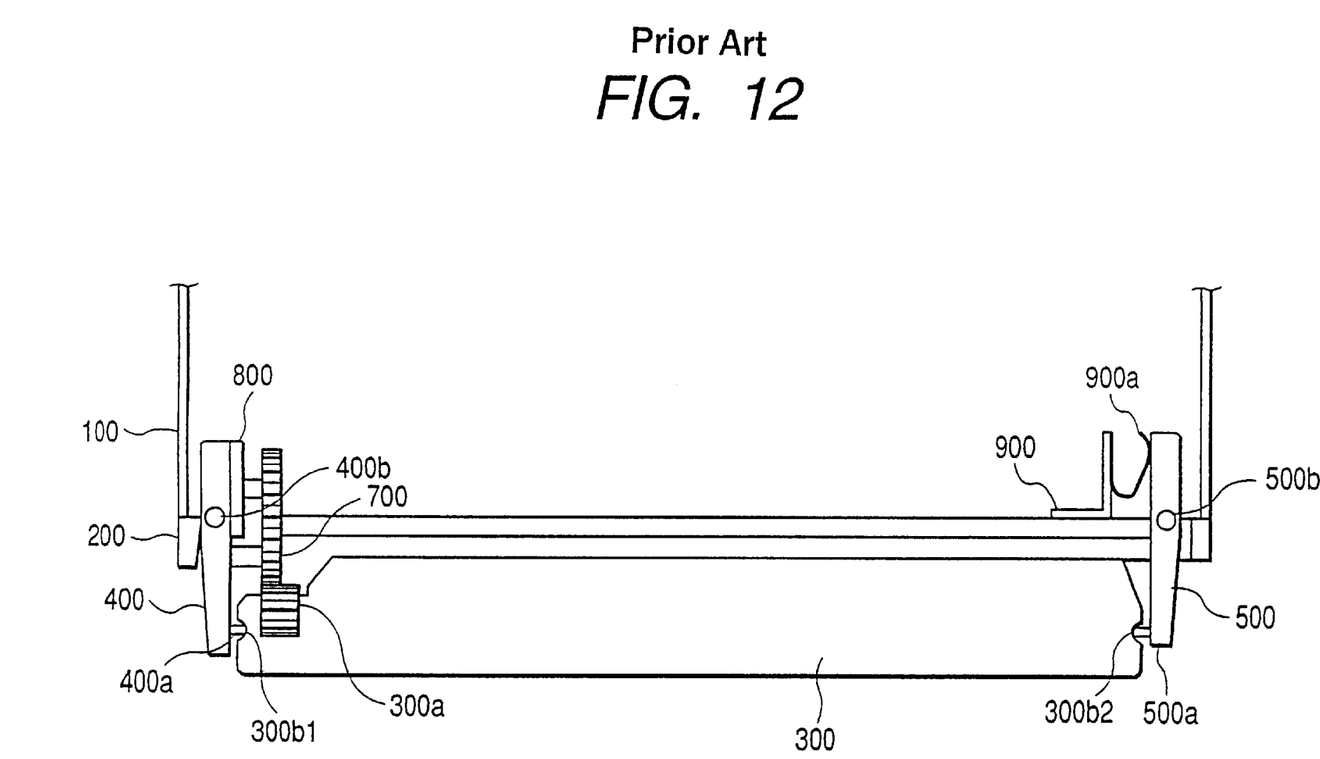
FIG. 12 is another view used for illustrating the front-panel attaching/detaching mechanism of the conventional electronic equipment.
Figure 13:
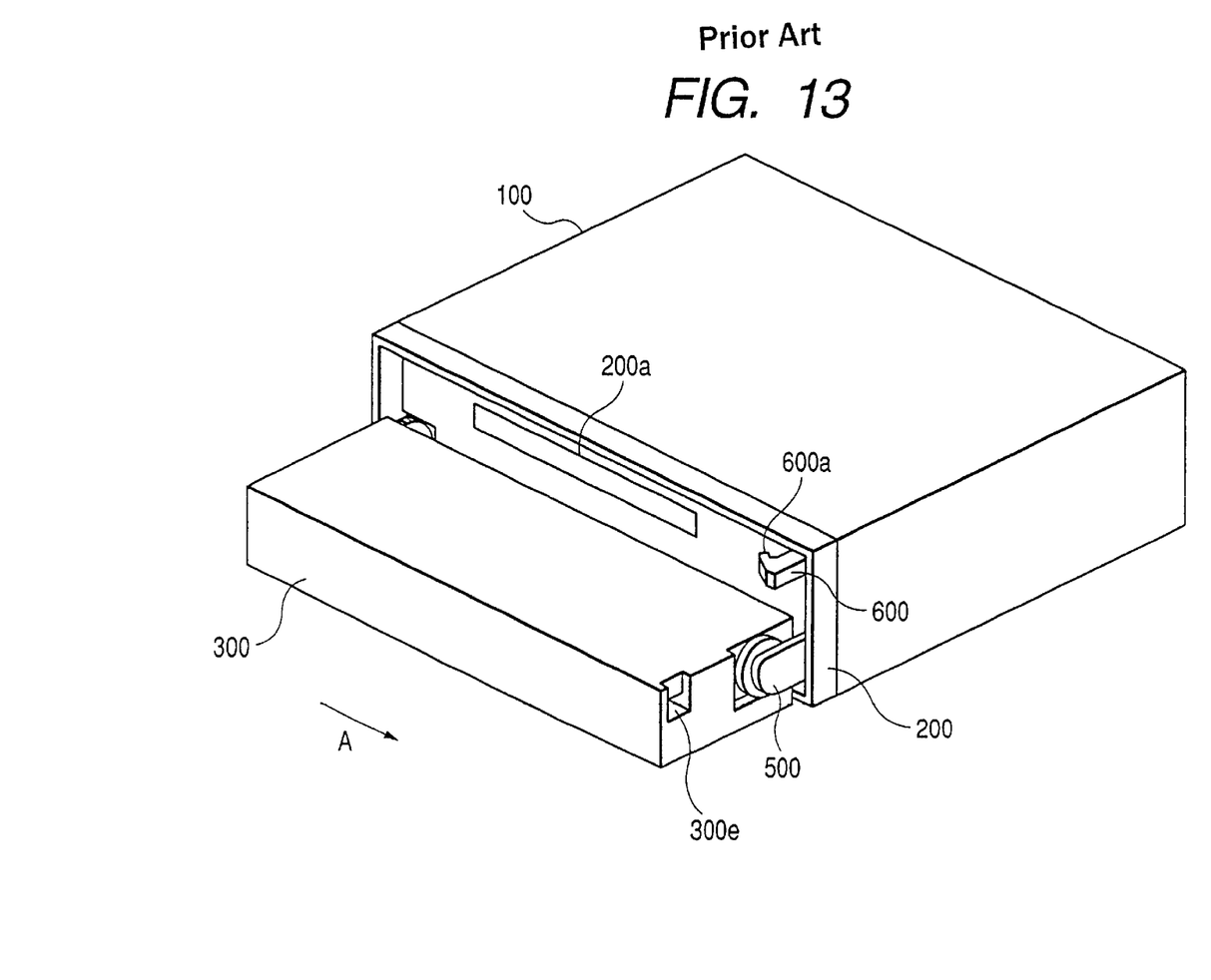
FIG. 13 is another view used for illustrating the front-panel attaching/detaching mechanism of the conventional electronic equipment.

FIG. 10 is a perspective view showing the outside appearance of the conventional electronic equipment and illustrates a state in which a front panel 300 is not attached to an equipment body 100 yet. FIG. 11 is a perspective view illustrating the outside appearance of each of the front panel 300 and the equipment body 100 in the case that the front panel 300 is attached to the equipment body 100. FIG. 12 is a sectional view taken on line A—A of FIG. 11. Further, FIG. 13 is a perspective view illustrating the outside appearance of each of the front panel 300 and the equipment body 100 in the case that the front panel 300 is tilted.

As illustrated in FIG. 10, a concave subpanel 200 is attached to the front portion of the equipment body 100. An insertion hole 200b, into which a recording medium, such as a CD, is inserted, is formed in a wall surface portion 200a of the subpanel 200. A turning arm 400 is provided in the bottom portion of the left-hand side of the subpanel 200, as viewed in this figure. This turning arm 400 is attached to the subpanel 200 so that a projection 400a, which is formed at an end portion thereof in such a manner as to be integral therewith, and a gear 700 rotatably supported by a shaft nearly at the center thereof are exposed from the wall surface 200a thereof. Further, a turning arm 500 is provided attached to a right-side part of the bottom portion of the subpanel 200, as viewed in this figure, so that a projection 500a, which is formed at an end portion thereof in such a manner as to be integral therewith, is exposed from the wall surface 200a thereof.

Moreover, a lock arm 600 is provided at a right-side top portion of the subpanel 200, as viewed in this figure. This lock arm 600 is attached to the subpanel 200 so that an engaging claw 600a formed at an end portion thereof is exposed from the wall surface 200a. Incidentally, this lock arm 600 is pushed by an elastic member (not shown) so that the engaging claw 600a is turned toward the center of the wall surface 200a.

On the other hand, recesses 300b1 (shown in FIG. 12) and 300b2 are formed at a left-side-part and a right-side part of the bottom portion of the front panel 300, respectively. These recesses 300b1 and 300b2 are fitted around the projections 400a and 500a, so that the front panel 300 is turnably supported by the equipment body 100. Further, a sector gear 300a (shown in FIG. 12) is formed on a rear surface side of the front panel 300 in such a way as to be integral therewith. Furthermore, a concave portion 300e, which engages with the engaging claw 600a, and a push button 300d to be operated at the time of tilting the front panel 300 are formed on the front panel 300.

As shown in FIG. 11, the front panel 300 is attached to the equipment body 100 by being housed in the concave portion of the subpanel 200.

As illustrated in FIG. 12, the turning arm 400 is pushed by an elastic member (not shown) in such a way as to turn counterclockwise, that is, in a direction, in which the turning arm 400 is fitted into the recess 300b1, by employing a pin 400b as a fulcrum. Further, the turning arm 400 is provided with a gear damper 800 adapted to mesh with the gear 700. The gear 700 of the turning arm 400 meshes with the sector gear 300a when the front panel 300 is attached to the equipment body 100. Furthermore, the turning arm 500 is pushed by a leaf spring 900a, which is attached to a bracket 900, in such a manner as to turn clockwise, that is, in a direction, in which the projection 500a is fitted into a recess 300b2, by employing the pin 500b as a fulcrum.

In the case of employing the mechanism for attaching and detaching the front panel 300, which is constructed in the aforementioned manner, when a user attaches the front panel 300 to the equipment body 100, the front panel 300 is positioned so that the rear-surface-side thereof faces the wall surface 200a of the subpanel 200, as illustrated in FIG. 10. Then, the turning arm 400 is turned clockwise by first applying a force, which acts against the pushing force of the elastic member, thereto while the projection 400a is fitted into the recess 300b1 of the front panel 300. Furthermore, during a state in which the turning arm 400 is turned, a right-side surface portion of the front panel 300 is fitted into the recess portion of the subpanel 200. Then, the force acting against the pushing force of the elastic member is released. Thereupon, the recess 300b2 of the front panel 300 is fitted around the projection 500a. The engaging claw 600a of the lock arm 600 is engaged with the concave portion 300e of the front panel 300. Further, as illustrated in FIG. 11, the front panel 300 is attached to the equipment body 100 by pushing each of the turning arm 400, the turning arm 500, and the lock arm 600 toward the center of the front panel 300.

On the other hand, when a user removes the front panel 300 illustrated in FIG. 11, which has been attached to the equipment body 100, therefrom, first, the user pushes the push button 300d provided on the front panel 300 to thereby cancel an engaged state, in which the engaging claw 600a of the lock arm 600 and the concave portion 300e of the front panel 300 engage each other. Then, as illustrated in FIG. 13, each of the gear damper 800, the gear 700, and the sector gear 300a is turned, so that the front panel 300 is tilted to a position (shown in FIG. 13), in which the insertion hole 200a is opened, by employing the projections 400 and 500 as turning shafts.

During a state in which the front panel 300 is tilted to a position in which the insertion hole 200a is opened, the user moves the front panel 300 in such a way as to turn one of the turning arms 400 and 500. For instance, when the front panel 300 is moved in the direction of an arrow A shown in FIG. 13, the turning arm 500 turns counterclockwise against the pushing force of the leaf spring 10 about pin 15. Thereupon, the front panel 300 is moved to thereby cancel a fitted state, in which the projection 400a of the turning arm 400 is fitted into the recess 300b1 of the front panel 300. Then, the front panel 300 is moved in a direction in which the front panel 300 goes away from the subpanel 200, so that the fitting between the projection 500a of the turning arm 500 and the recess 300b2 of the front panel 300 is released. Thus, the front panel 300 is removed from the equipment body 100.

As described above, in the case of the conventional mechanism for attaching and detaching the front panel, when the front panel 300 is attached to the equipment body 100, the fitting between the recess 300b2 of the front panel 300 and the projection 500a of the turning arm 500 and the engagement between the engaging claw 600e of the lock arm 600 and the concave portion 300e of the front panel 300 are almost simultaneously performed.

However, because of the fact that the fitting between the recess 300b2 of the front panel 300 and the projection 500a of the turning arm 500 and the engagement between the engaging claw 600e of the lock arm 600 and the concave portion 300e of the front panel 300 are almost simultaneously performed, for example, when the magnitude of a force exerted by the user to the front panel 300 is small, a state, in which the engaging claw 600e and the concave portion 300e engage each other, and in which the projection 500a is not fitted into the recess 300b2, may occur. Then, the front panel 300 is brought into a state in which the front panel 300 is apparently attached to the equipment body 100. That is, the user uses the electronic equipment without being aware of the fact that the front panel 300 is incompletely attached to the equipment body 100.

Under such circumstances, when the user operates the push button 300d so as to insert a recording medium, such as a CD, into the equipment body 100, there occurs a situation in which the front panel 300 drops.

SUMMARY OF THE INVENTION

The present invention is accomplished in view of the aforementioned circumstances. Accordingly, an object of the invention is to provide electronic equipment having a front-panel attaching/detaching mechanism enabled to prevent an occurrence of a state in which a front panel is incompletely attached to an equipment body.

To achieve the foregoing object, according to the invention, there is provided electronic equipment (hereunder referred to as first electronic equipment of the invention) having a front panel, which is attachable to and detachable from an equipment body. In this electronic equipment, the equipment body comprises projection portions to be respectively fitted to fitting holes provided in the front panel, a turning member to be turned when the projection portions are respectively fitted into the fitting holes, and an engaging member adapted to abut against the turning member and to be engaged with an engaging portion provided in the front panel. The engaging member is moved to a place, at which said engaging member engages with said engaging portion, when the projection portions are respectively fitted into the fitting holes and when an abutting state, in which the engaging member abuts against the turning member, is canceled as the turning member performs a turning operation.

Further, according to an embodiment of the first electronic equipment of the invention, the turning member comprises a sector gear rotatably attached to the projection portion, and a flange portion formed in such a way as to be integral with a drive gear that meshes with the sector gear. Further, the engaging member has an abutting portion that abuts against the flange portion. Furthermore, an abutting state, in which the abutting portion abuts against the flange portion, is canceled as the flange portion is turned by a predetermined angle.

Moreover, according to another embodiment of the first electronic equipment of the invention, the equipment body has pushing means for pushing the engaging member in a direction in which the engaging member abuts against the turning member. The engaging member is moved by a pushing force of the pushing means to a place at which the engaging member engages with the engaging portion.

Furthermore, according to another embodiment of the first electronic equipment of the invention, the fitting holes are respectively provided in both side parts of the bottom portion of the front panel. Further, the projection portions are respectively fitted into the fitting holes to thereby serve as turning shafts, around which the front panel is turned in a direction of thickness of the equipment body. Moreover, the front panel is turned in the direction of thickness of the equipment body by a turning operation of the turning member by using the projection portions as the turning shafts.

DETAILED DESCRIPTION OF THE PREFERRED EMBODIMENTS

Next, an embodiment of electronic equipment of the invention is described hereinafter with reference to the accompanying drawings. First, the configuration of the electronic equipment according to this embodiment is described hereinbelow by referring to FIGS. 1 to 4.

Figure 1:
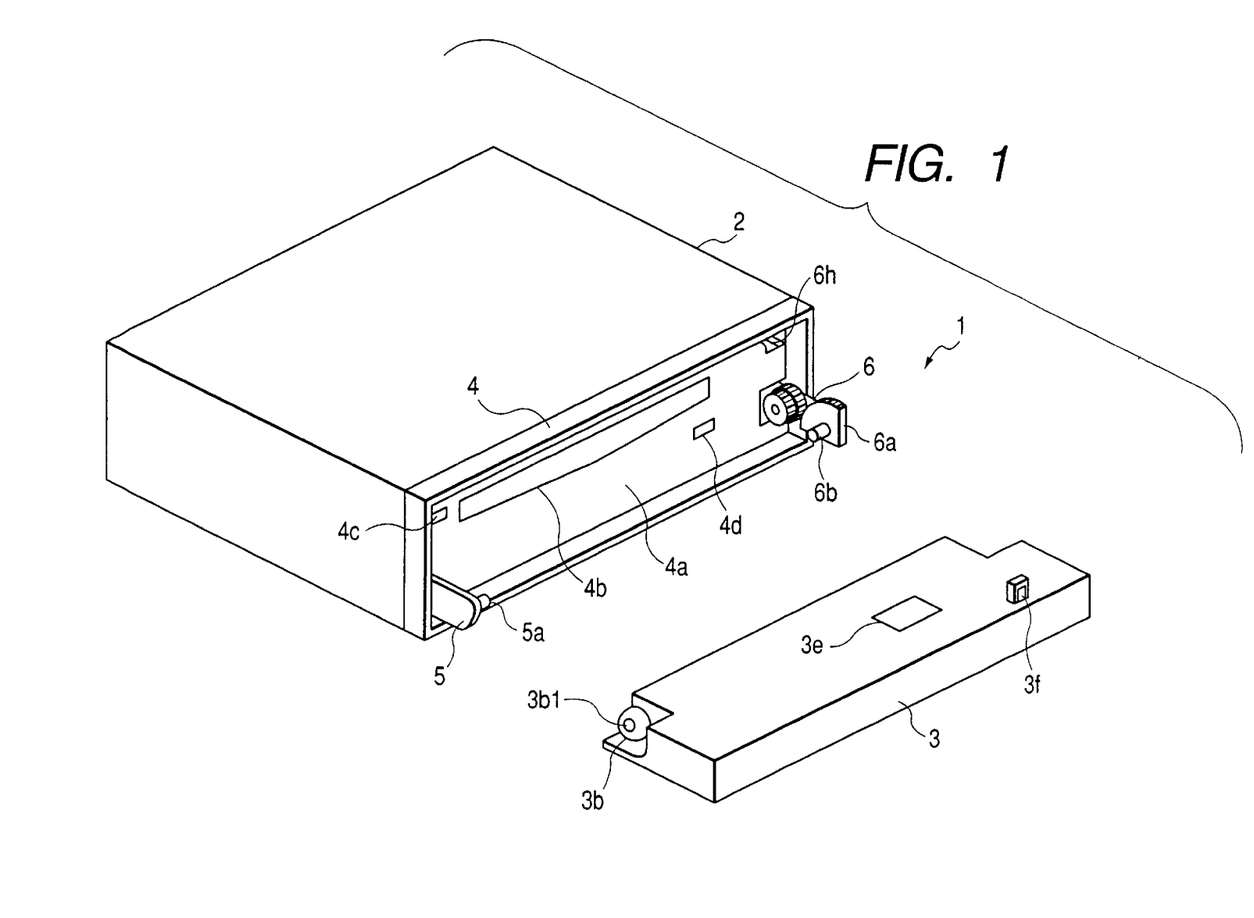
FIG. 1 is a perspective view illustrating an equipment body 2 and a front panel 3 of electronic equipment 1 according to the invention.
Figure 2:
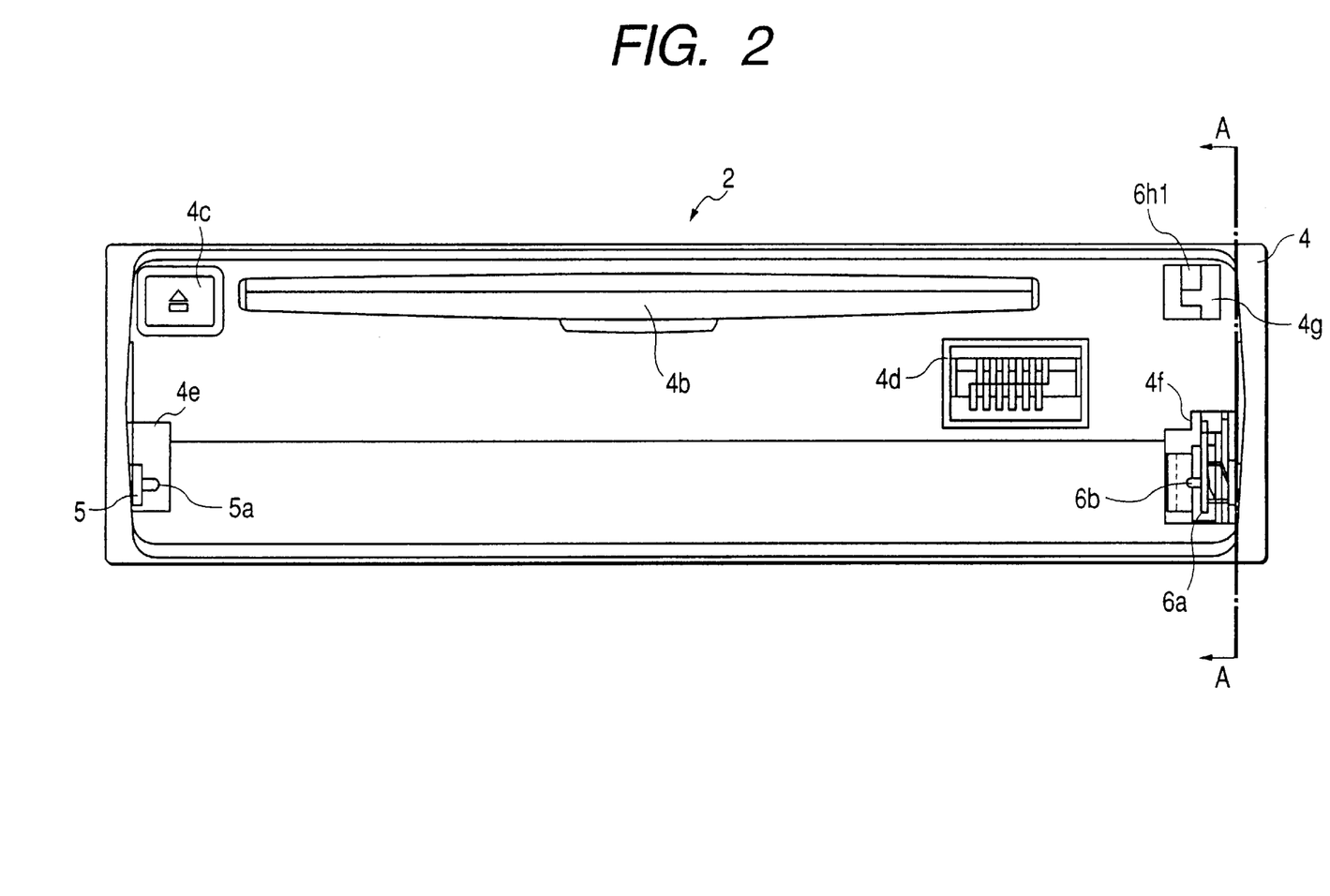
FIG. 2 is a front view illustrating the equipment body 2 of the electronic equipment 1.
Figure 3:
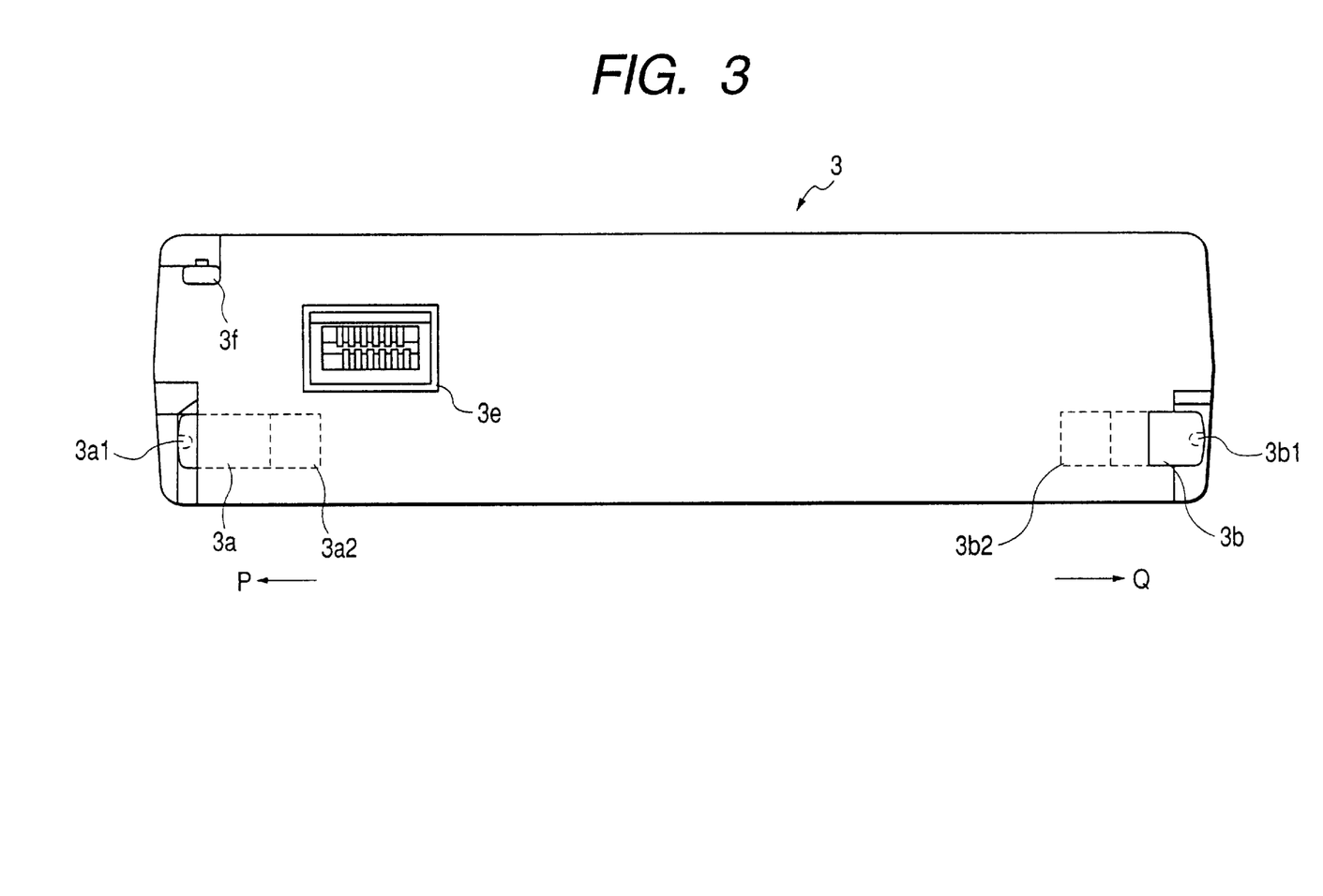
FIG. 3 is a rear view illustrating the front panel 3 of the electronic equipment 1.
Figure 4:
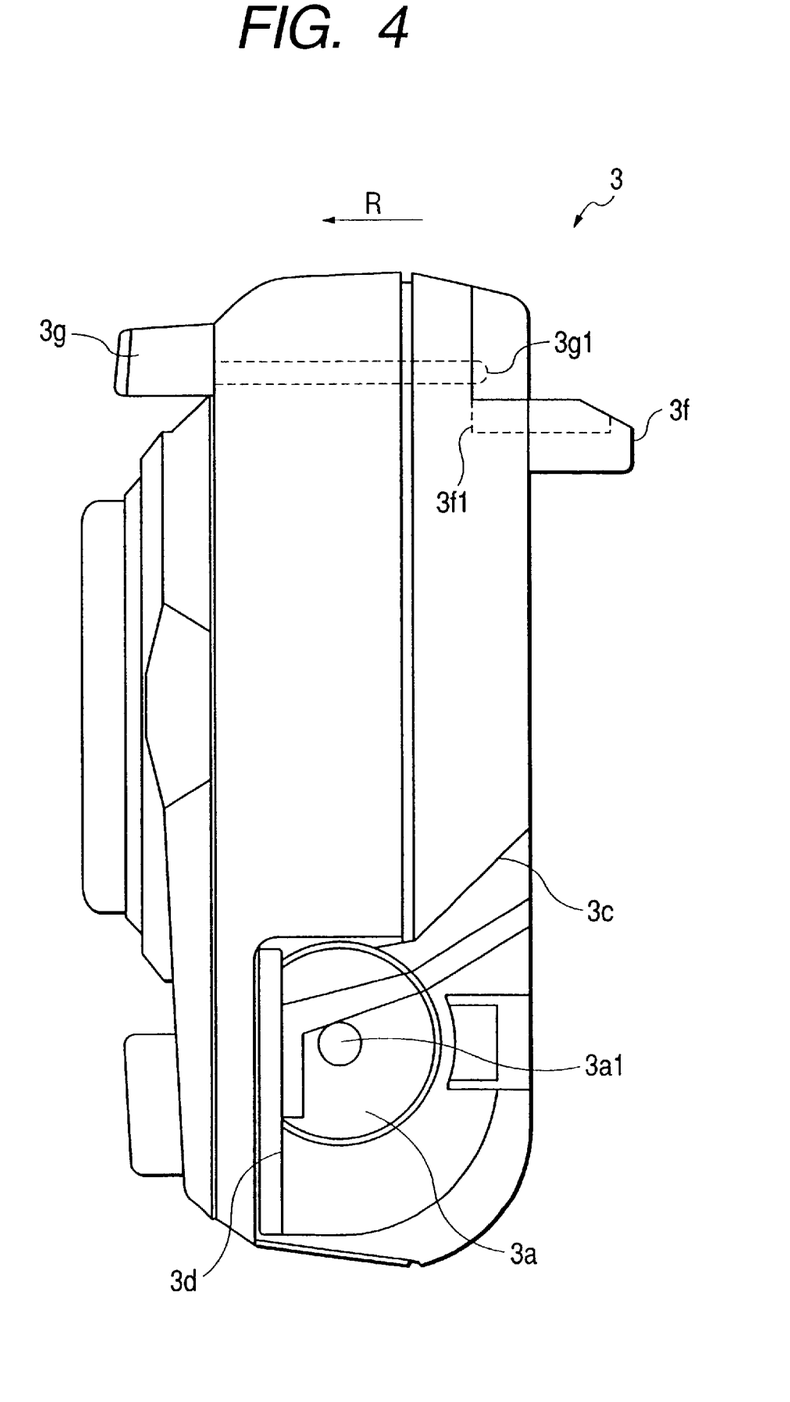
FIG. 4 is a side view illustrating the front panel 3 of the electronic equipment 1.

Incidentally, FIG. 1 is a perspective view illustrating the equipment body 2 and the front panel 3 of electronic equipment 1 according to this embodiment. FIG. 2 is a front view illustrating the equipment body 2, which is seen from the front thereof. FIG. 3 is a rear (or back) view illustrating the front panel 3. FIG. 4 is a side view illustrating the front panel 3.

As illustrated in FIGS. 1 and 2, a concave subpanel 4 is attached to the front portion of the equipment body 2. An insertion hole 4b, into which a recording medium (hereunder referred to as "a disc"), such as a CD, is inserted, and an eject button 4c to be operated to carry out the inserted disc, and a receiving-connection connector 4d to be connected to an inserting-connection connector (to be described later) of the front panel 3 are provided in a wall surface portion 4a of the subpanel 4. Furthermore, nearly rectangular holes 4e and 4f are formed in the vicinity of both side parts of the bottom portion of the wall surface 4a.

A support plate 5 having a projection portion 5a integrally formed at a tip end portion thereof, and a turn locking mechanism 60 are provided on the subpanel 4. The support plate 5 is attached thereto so that the projection portion 5a is exposed from the wall surface 4 through the hole 4e. Further, the support plate 6 having a sector gear 6a and a projection portion 6b, on which the sector gear 6a is rotatably supported, of the turn locking mechanism 60 are attached to the subpanel 4 so that the sector gear 6a and the projection portion 6b are exposed from the wall surface 4a through the hole 4f. Further, a hole 4g is formed above the hole 4f in the wall surface portion 4a. An engaging arm 6h1 of the turn locking mechanism 60 is attached to the subpanel 4 in such a way as to be inserted into the hole 4g. Incidentally, the detail of this turn locking mechanism 60 will be described later.

On the other hand, as illustrated in FIGS. 1, 3, and 4, hemispherical projection receiving portions 3a and 3b, in the central part of each of which a corresponding one of the depression portions 3a1 and 3b1 is formed, are provided in both side parts of the bottom portion of the front panel 3. These projection receiving portions 3a and 3b are pushed by springs 3a2 and 3b2 in the directions of arrows P and Q shown in FIG. 3, respectively. Further, an incline portion 3c, which abuts against the sector gear 6a when the front panel 3 is attached to the equipment body 2 by being accommodated in the concave portion of the subpanel 4, and an abutting surface 3d, which abuts against the sector gear 6a when attached to the equipment body 2, are formed in the proximity of the projection receiving portion 3a.

Further, an inserting-connection connector 3e, which is connected to the receiving-connection connector 4d of the wall surface 4a when the front panel 3 is attached to the equipment boy 2, is provided on the rear surface side of the front panel 3. Furthermore, the engaging projection portion 3f to be engaged with the tip end of the engaging arm 6h1 is provided at a part, which is higher than the inserting-connection connector 3e, of the rear surface portion of the front panel 3. The front panel 3 and the equipment body 2 are electrically connected to each other by connecting this receiving-connection connector 4d to the inserting-connection connector 3e. Moreover, an engaging concave portion 3f1, into which an engaging claw 6h2 (shown in FIG. 5) formed at the tip end portion of the engaging arm 6h1 is inserted, is formed in the engaging projection portion 3f.

Further, an OPEN button 3g to be operated so as to cancel the state of engagement between the engaging arm 6h1 and the engaging projection portion 3f is provided at a front-surface-side upper portion of the front panel 3. This OPEN button 3g is pushed by an elastic member (not shown) in the direction of an arrow R shown in FIG. 4. Furthermore, a pushing rod 3g1 is connected to the OPEN button 3g. This pushing rod 3g1 is connected thereto in such a way as to be moved in the engaging concave portion 3f1 by pushing the OPEN button 3g in a direction opposite to the direction of the arrow R shown in FIG. 4, so that the pushing rod 3g1 moves in the same direction as the direction, in which the OPEN button 3g moves.

Figure 5:
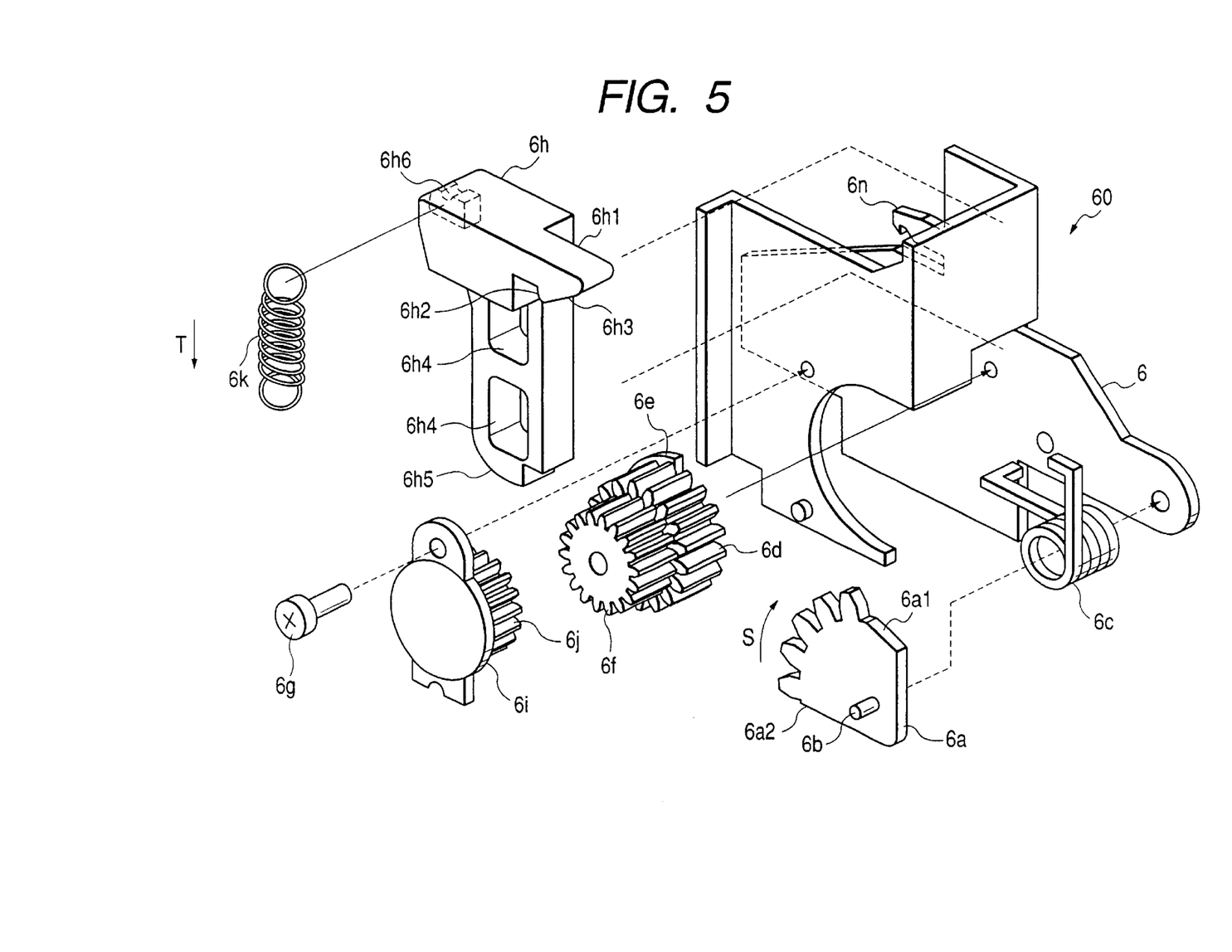
FIG. 5 is an assembly and development view illustrating a turn locking mechanism 60 used in the electronic equipment 1.

Next, the configuration of the aforementioned turn locking mechanism 60 of this embodiment is described hereinbelow by referring to FIG. 5. Incidentally, FIG. 5 is an assembly and development view illustrating the turn locking mechanism 60.

The turn locking mechanism 60 has a projection portion 6b fixed to the support plate 6, a winding spring 6c wound around the projection portion 6b, and a sector gear 6a rotatably attached to the projection portion 6b. The winding spring 6c is interposed between the sector gear 6a and the support plate 6 and pushes the sector gear 6a in the direction of an arrow S in this figure. Further, this sector gear 6a has a cutout surface 6a1 and an abutting surface 6a2. Incidentally, when the front panel 3 is not attached to the equipment body 2, the sector gear 6a is in a state in which the cutout surface 6a1 is inclined by the winding spring 6c to the wall surface 4a by a predetermined angle.

Furthermore, the turn locking mechanism 60 has a drive gear 6d, which is formed in such a way as to be integral with a semi-disk-like flange portion 6e, an engaging member 6h, and a spring 6k.

The drive gear 6d is turnably attached to the support plate 6 so that the flange portion 6e is interposed between the drive gear 6d and the support plate 6. Further, an interlocking gear 6f and the drive gear 6d are coaxially provided on a shaft (not shown), on which the drive gear 6d is turnably supported. The interlocking gear 6f is disposed on a side opposite to the side on which the flange portion 6e of the drive gear 6d is placed. Furthermore, the interlocking gear 6f meshes with a damper gear 6j turnably attached to the damper portion 6i. The damper portion 6i is attached to the support plate 6 by a machine screw 6g. Viscous liquid is filled in the damper portion 6i. That is, a torque load, which is proportional to the rotating speed of the damper gear 6j, is generated by filling the damper portion 6i with this viscous liquid.

The engaging member 6h is formed nearly like a rectangle elongated in the direction of an arrow T shown in FIG. 5. Two through holes 6h4, 6h4 are formed in the engaging member 6h. Further, machine screws (not shown) are attached to the support plate 6 by being respectively passed through the through holes 6h4, 6h4. Thus, the engaging member 6h is attached to the support plate 6 in such a way as to be able to move in the direction of T in the figure. That is, the through holes 6h4, 6h4 are employed as guide holes. Then, the machine screws are respectively moved along the guide holes. This enables the displacement of the engaging member 6h.

Furthermore, the aforementioned engaging arm 6h1 is formed at a side of the top of the engaging member 6h. The engaging arm 6h1 has an engaging claw 6h2, which is inserted into the aforementioned engaging concave portion 3f1, and a slope 6h3 to be pushed by the pushing rod 3g1.

Further, a hook portion 6h6 is formed at a side, which is opposite to the engaging arm 6h1, of the top of the engaging member 6h. An end of a spring 6k is hooked onto this hook portion 6h6. Moreover, the other end of the spring 6k is hooked onto the hook portion 6n. Thus, the engaging member 6h is pushed by a pushing force of the spring 6k in the direction of an arrow T shown in this figure. Furthermore, the bottom portion of the engaging member 6h has an abutting portion 6h5 abutting against an outer peripheral edge of the flange portion 6e.

Figure 6:
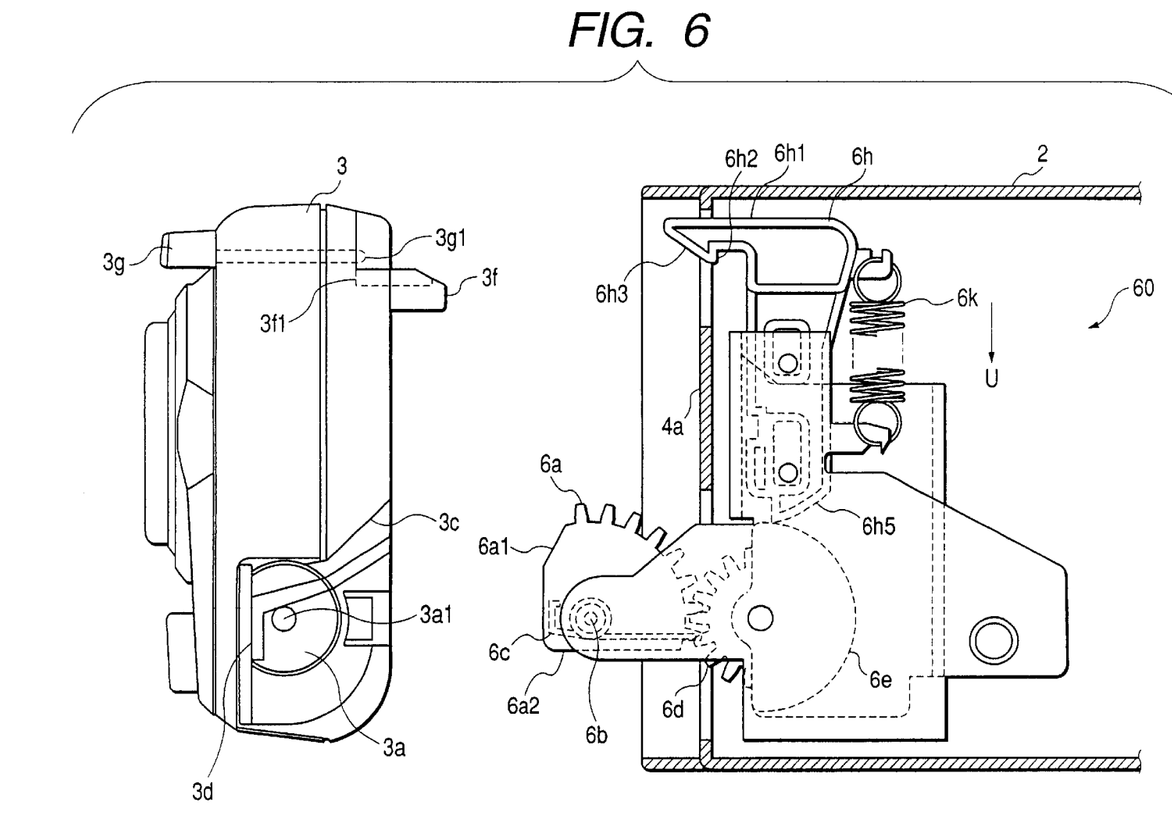
FIG. 6 is a side view illustrating a state in which the front panel 3 is placed in such a manner as to face the equipment body 2.
Figure 7:
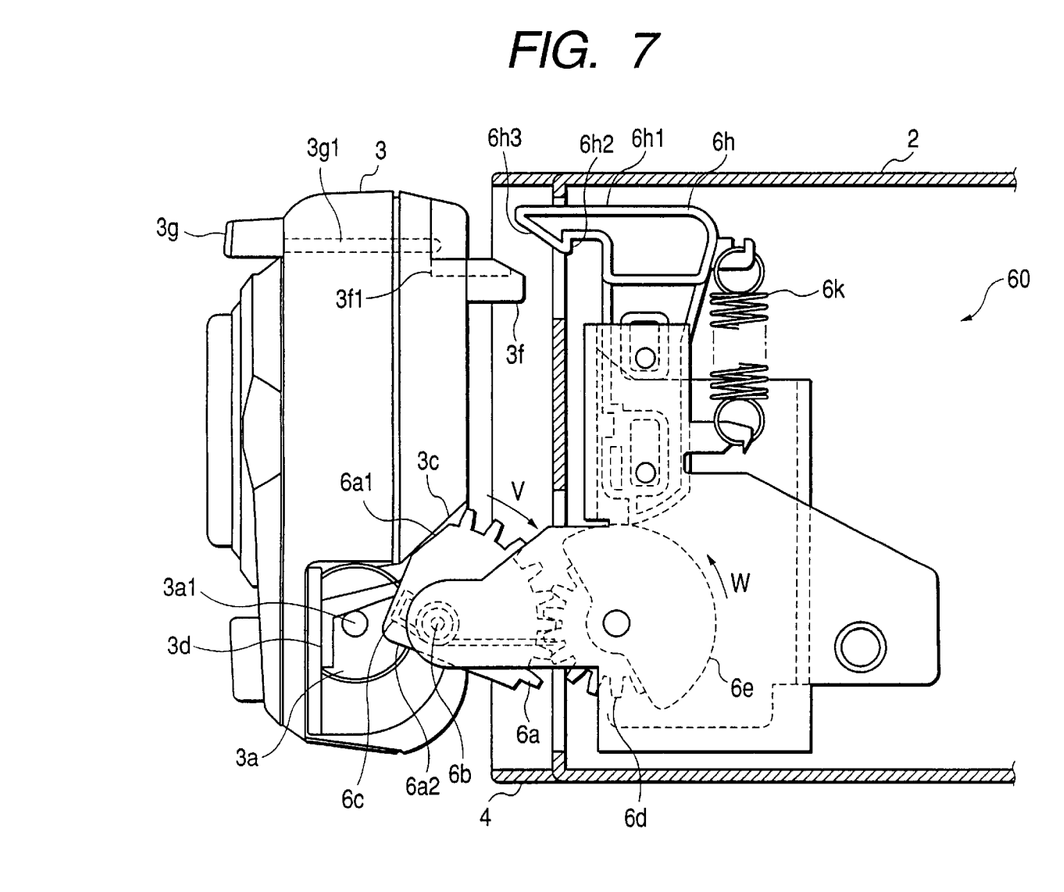
FIG. 7 is a side view illustrating a state in which the front panel 3 is being attached to the equipment body 2.
Figure 8:
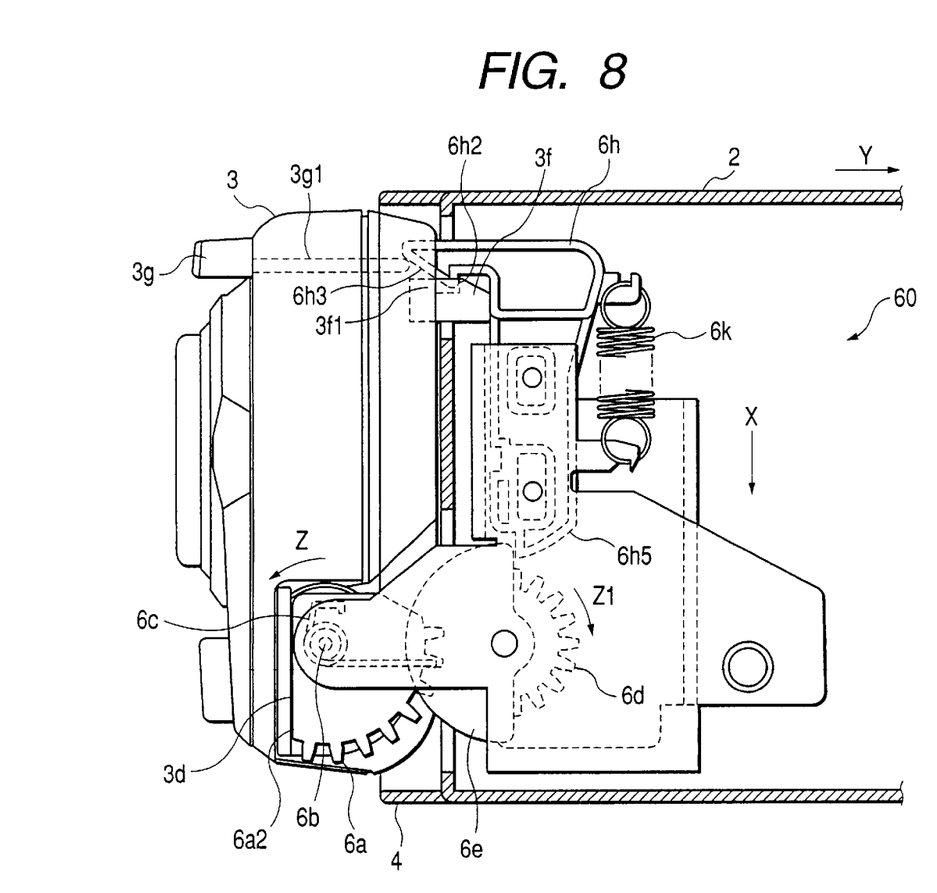
FIG. 8 is a side view illustrating a state in which the front panel 3 is attached to the equipment body 2.
Figure 9:
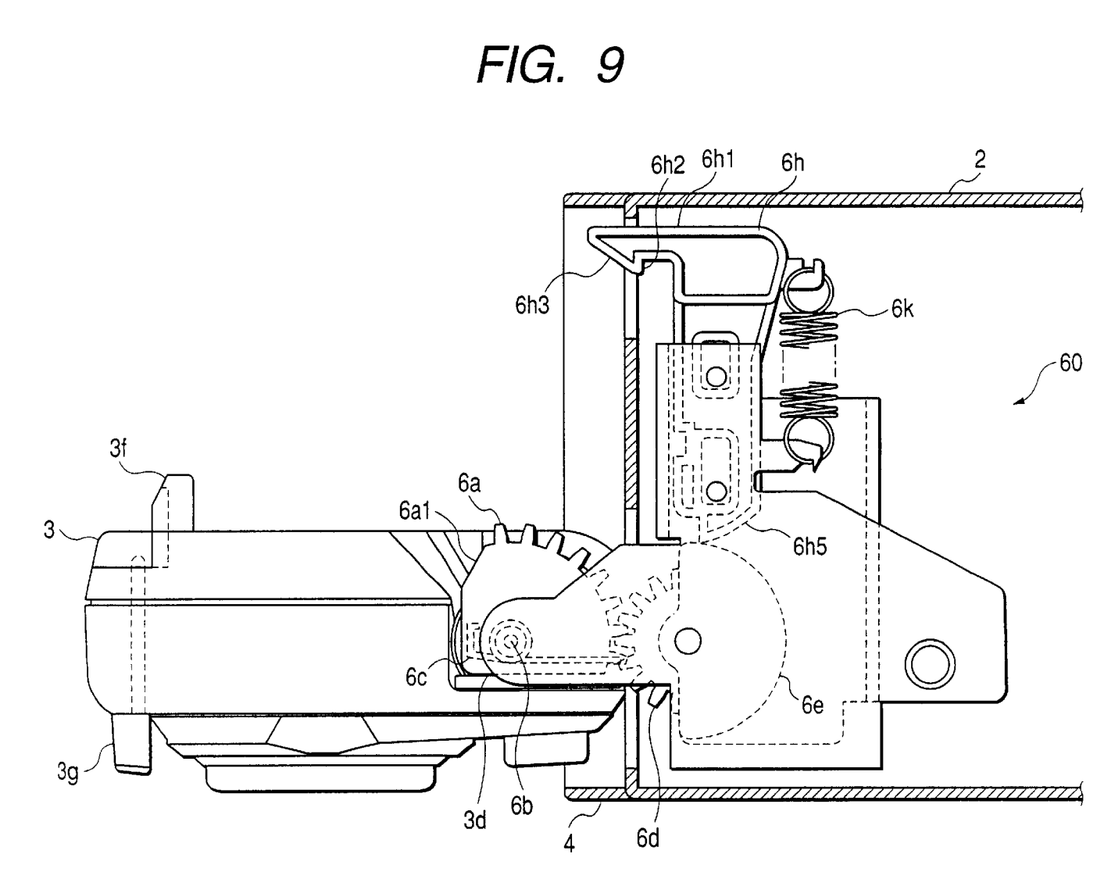
FIG. 9 is a side view illustrating a state in which the front face of the equipment body 2 is opened by turning the front panel 3.

Next, an operation of the turn locking mechanism 60 at the time of attaching the front panel 3 to and detaching the front panel 3 from the equipment body 2 is described hereinbelow by referring to FIGS. 6 to 9. Incidentally, each of FIGS. 6 to 9 shows a side view of the front panel 3 and a sectional view of the equipment body 2, which is taken on line A—A of FIG. 2. Further, FIG. 6 illustrates a state, in which the front panel 3 is not attached to the equipment body 2 yet. FIG. 7 illustrates a state, in which the front panel 3 is being attached to the equipment body 2. FIG. 8 illustrates a state, in which the front panel 3 is attached to the equipment body 2. FIG. 9 is a side view illustrating a state at the time of removing the front panel 3 from the equipment body 2, in which the front panel 3 is turned to a position where the front face of the equipment body 2 is opened.

First, an operation of the turn locking mechanism 60 at the time of attaching the front panel 3 to the equipment body 2 is described hereinbelow.

As illustrated in FIG. 6, first, a user locates the rear surface side of the front panel 3 on the equipment body 2, that is, positions the front panel 3 in such a way as to face the wall surface 4a of the subpanel 4. At that time, the cutout surface 6a1 of the sector gear 6a of the turn locking mechanism 60 is in a state in which the cutout surface 6a1 faces the inclination portion 3c formed on the front panel 3. Further, the outer peripheral edge part of the flange portion 6e formed in such a way as to be integral with the drive gear 6d is made to abut against the abutting portion 6h5 of the engaging member 6h. Furthermore, the engaging member 6h is pushed by a pushing force of the spring 6k in the direction of an arrow U shown in this figure.

Then, the user fits the projection portion 5a of the support plate 5, which is provided on the equipment body 2, into the depression part 3b1 of the projection receiving portion 3b provided at the left-hand side of the bottom portion of the front panel 3, as viewed in this figure. Subsequently, the user pushes the projection receiving portion 3b against the pushing force of the spring 3b2 in the direction toward the inside of the front panel 3, so that the right-hand side surface portion of the front panel 3 is housed in the concave portion of the subpanel 4.

When the right-side surface portion of the front panel 3 is housed in the concave portion of the subpanel 4, the inclination portion 3c of the front panel 3 abuts against the cutout surface 6a1 of the sector gear 6a, as illustrated in FIG. 7. Further, the inclination portion 3c turns the sector gear 6a in the direction of an arrow V shown in this figure against the pushing force of the winding spring 6c by using a thrusting force which the user applies thereto so as to house the front panel 3 in the concave portion. Then, the drive gear 6d and the flange portion 6e are turned in the direction of an arrow W shown in this figure by turning the sector gear 6a by employing the projection portion 6b as the turning shaft. At that time, the abutting portion 6h5 of the engaging member 6h is still made to abut against the outer peripheral edge part of the flange portion 6e.

Then, when the user applies the thrusting force thereto still more, the inclination portion 3c of the front panel 3 causes the sector gear 6a to turn still more, as illustrated in FIG. 8. Further, the projection portion 6b of the sector gear 6a is fitted into the depression portion 3a1 by simultaneously pushing the projection receiving portion 3a of the front panel 3 in the direction toward the inside of the front panel 3 against the pushing force of the spring 3a2. Even after this projection portion 6b is fitted into the depression portion 3a1, the sector gear 6a is still turned by the inclination portion 3c. Moreover, the drive gear 6d and the flange portion 6e are still turned. When the flange portion 6e is turned by 180 degrees, the state, in which the abutting portion 6h5 of the engaging member 6h abuts against the outer peripheral edge part of the flange portion 6e, is canceled. Then, the engaging member 6h is moved by the pushing force of the spring 6k in the direction of an arrow X shown in this figure. The engaging claw 6h2 of the engaging arm 6h1 is inserted into the engaging concave portion 3f1 formed in the engaging projection portion 3f of the front panel 3 by moving this engaging member 6h. Thus, the engaging arm 6h1 is engaged with the engaging projection portion 3f. Incidentally, when the flange portion 6e is turned by 180 degrees, the abutting surface 6a2 of the sector gear 6a is made to abut against the abutting surface 3d of the front panel 3. Moreover, the turn of the sector gear 6a is stopped. Thus, when the front panel 3 is attached to the equipment body 2, the engaging member 6h is moved by turning the sector gear 6a still more after the projection portion 6b is fitted into the depression part 3a1 of the projection receiving portion 3a of the front panel 3. Then, the engaging arm 6h1 of the engaging member 6h engages with the engaging projection portion 3f of the front panel 3.

Next, an operation of removing the front panel 3, which has been attached to the equipment body 2, therefrom, as illustrated in FIG. 8, is described hereinafter. Incidentally, the user removes the front panel 3 therefrom after the front panel 3 is turned to a position where the front face of the equipment body 2 (that is, the wall surface 4a of the subpanel 4) is opened.

First, an operation of turning the front panel 3 is described hereinbelow.

When the OPEN button 3g provided on the front panel 3 is pushed by the user, the slope 6h3 of the engaging arm 6h1 is pushed by the tip end of the pushing rod 3g1 connected to the OPEN button 3g in the direction of an arrow Y shown in FIG. 8. Then, the engaging member 6h is lifted in a direction opposite to the direction of the arrow X shown in this figure against the pushing force of the spring 6k. Subsequently, the state of the engagement established between the engaging arm 6h1 and the engaging projection portion 3f is canceled.

When the state of the engagement established between the engaging arm 6h1 and the engaging projection portion 3f is canceled, the sector gear 6a is turned in the direction of an arrow Z shown in this figure by the pushing force of the winding spring 6c by using the projection portion 6d as a turning shaft. As the sector gar 6a turns, the drive gear 6d and the flange portion 6e are turned in the direction of an arrow Z1 shown in this figure. Then, when the flange portion 6e is turned to a place at which the outer peripheral edge part of the flange portion 6e can abut against the abutting portion 6h5 of the engaging member 6h, the pushing state of the pushing rod 3g1 is canceled, so that the abutting portion 6h5 is made by the pushing force of the spring 6k to abut against the outer peripheral part of the flange portion 6e.

The sector gear 6a is turned by the pushing force of the winding spring 6c. Thus, the front panel 3 is turned by employing the projection portions 6b and 5a as the turning shafts. At that time, the interlocking gear 6f, which is disposed so that the interlocking gear 6f and the driving gear 6d meshing with the sector gear 6a are coaxially-provided, receives the torque load of the damper portion 6i. Thus, the front panel 3 can be slowly turned.

Then, as illustrated in FIG. 9, the front panel 3 is turned to the position where the front face of the equipment body 2 is opened. When the front panel 3 is turned to the position where the front face of the equipment body 2 is opened, each of the members of the aforementioned turn locking mechanism 60 is put into the state illustrated in FIG. 6, in which the front panel 3 is not attached to the equipment body 2 yet.

Furthermore, at that time, the front face (that is, the wall surface 4a of the subpanel 4) is opened. Thus, the insertion hole 4b formed in the front face is exposed. Then, the disc inserted in the equipment body 2 can be ejected by causing the user to operate the eject button 42. Further, in the case that no disc is inserted in the equipment body 2, a disc can be inserted into the equipment body 2 from the insertion hole 4b. Then, the user enters a stage in which an operation of removing the front panel 3 from the front face of the equipment body 2.

The user causes the front panel 3 to move in the upward direction normal to the plane of the paper, on which FIG. 9 is drawn, from the state, in which the front face of the equipment body 2 is opened. Then, the projection receiving portion 3a provided on the right side of the bottom portion of the front panel 3, as viewed in the direction toward the front face thereof, is pushed against the pushing force of the spring 3a2 in the direction toward the inside of the front panel 3. Further, the state, in which the projection portion 5a is fitted into the depression part 3b1 of the projection portion 3b provided on the left side of the bottom portion of the front panel 3, as viewed in the direction toward the front face thereof, is canceled. Moreover, the user causes the left side surface portion of the front panel 3, as viewed in the direction toward the front face thereof, to move in the direction in which the left side surface portion goes away from the equipment body 2. Thus, the state, in which the projection portion 6b is fitted into the depression part 3a1 of the projection receiving portion 3a provided on the right side of the bottom portion of the front panel 3, as viewed in the direction toward the front face thereof, is canceled. Consequently, the front panel 3 is completely removed from the equipment body 2.

Incidentally, although it has been described that the front panel 3 is removed therefrom by being moved in the upward direction normal to the plane of the paper, on which FIG. 9 is drawn, the front panel 3 may be removed therefrom by being moved in the downward direction normal to the plane of the paper, on which FIG. 9 is drawn. In this case, the projection receiving portion 3b provided on the left side of the bottom portion of the front panel 3, as viewed in the direction toward the front face thereof, is pushed against the pushing force of the spring 3b2 in the direction toward the inside of the front panel 3. Further, the state, in which the projection portion 6b is fitted into the depression part 3a1 of the projection receiving portion 3a provided on the right side of the bottom portion of the front panel 3, as viewed in the direction toward the front face thereof, is canceled. Moreover, the user causes the right side surface portion of the front panel 3, as viewed in the direction toward the front face thereof, to move in the direction in which the right side surface portion goes away from the equipment body 2. Thus, the state, in which the projection portion 5a is fitted into the depression part 3b1 of the projection receiving portion 3b provided on the left side of the bottom portion of the front panel 3, as viewed in the direction toward the front face thereof, is canceled. Consequently, the front panel 3 is completely removed from the equipment body 2.

As described above, when the front panel 3 is attached to the equipment body 2 in the electronic equipment 1 of this embodiment, the projection portion 6b is fitted into the depression portion 3a1 of the projection receiving portion 3a of the front panel 3. Subsequently, the engaging portion 6h is moved by turning the sector gear 6a still more. Then, the engaging claw 6h2 of the engaging arm 6h1 is inserted into the engaging recess part 3f1 of the engaging projection portion 3f to thereby cause the engaging arm 6h1 and the engaging projection portion 3f to engage with each other. Thus, the front panel 3 can reliably be attached to the equipment body 2.

Incidentally, although an example of the turn locking mechanism 60 of the electronic equipment 1 of this embodiment, in which the sector gear 6h is pushed by the winding spring 6c, has been described in the foregoing description of this embodiment, this turn locking mechanism may be adapted so that the drive gear 6d is pushed by the winding spring 6c.

According to the invention, the projection portion 6b of the equipment body 2 is fitted into the depression portion 3a1 of the front panel 3 during the sector gear 6a is turned. Further, the engaging member 6h is moved in synchronization with the subsequent turning operation of the sector gear 6a. Then, the engaging projection portion 3f of the front panel 3 is engaged with the engaging arm 6h1 of the equipment body 2. This does not cause a state, in which the front panel 3 is attached to the equipment body 2 in an incomplete condition, that is, a state in which the front panel 3 is apparently attached thereto. Consequently, the front panel 3 can reliably be attached to the equipment body 2.

What is claimed is:

1. An electronic equipment, comprising:
   an equipment body; and
   a front panel that is attachable to and detachable from said equipment body and has fitting holes therein and an engaging portion;
   wherein said equipment body comprises:
      a plurality of projection portions to be respectively fitted to the fitting holes provided in said front panel;
      a turning member to be turned when said projection portions are respectively fitted into said fitting holes; and
      an engaging member adapted to abut against said turning member and to be engaged with the engaging portion provided in said front panel;
      wherein said engaging member is moved to a place, at which said engaging member engages with said engaging portion, when said projection portions are respectively fitted into said fitting holes and when an abutting state, in which said engaging member abuts against said turning member, is canceled as said turning member performs a turning operation.

2. The electronic equipment according to claim 1, wherein said turning member comprises:
   a sector gear rotatably attached to a projection portion of said plurality of projection portions; and
   a flange portion formed in such a way as to be integral with a drive gear that meshes with said sector gear,
   wherein said engaging member has an abutting portion that abuts against said flange portion, and
   wherein an abutting state, in which said abutting portion abuts against said flange portion, is canceled as said flange portion is turned by a predetermined angle.

3. The electronic equipment according to claim 1, wherein said equipment body has pushing means for pushing said engaging member in a direction in which said engaging member abuts against said turning member, and wherein said engaging member is moved by a pushing force of said pushing means to a place at which said engaging member engages with said engaging portion.

4. The electronic equipment according to claim 1, wherein said fitting holes are respectively provided in both side parts of a bottom portion of said front panel, wherein said projection portions are respectively fitted into said fitting holes to thereby serve as turning shafts, around which said front panel is turned in a direction of thickness of said equipment body, and wherein said front panel is turned in the direction of thickness of said equipment body by a turning operation of said turning member by using said projection portions as the turning shafts.

* * * * *